M. REGAN.
LAWN MOWER ATTACHMENT.
APPLICATION FILED OCT. 24, 1910.
1,010,318.
Patented Nov. 28, 1911.
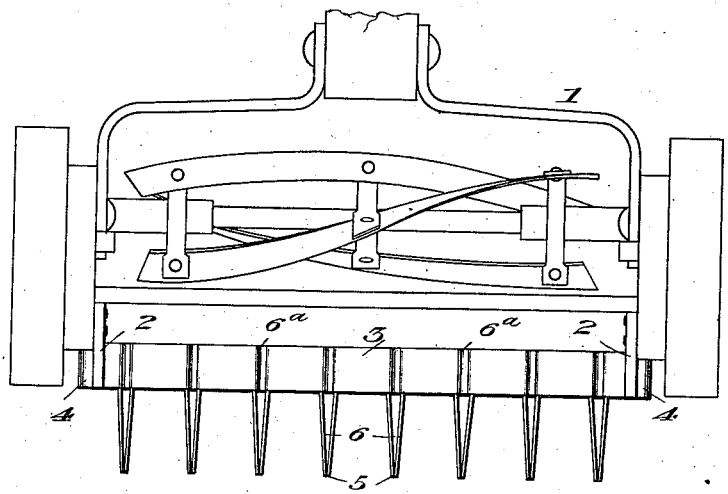
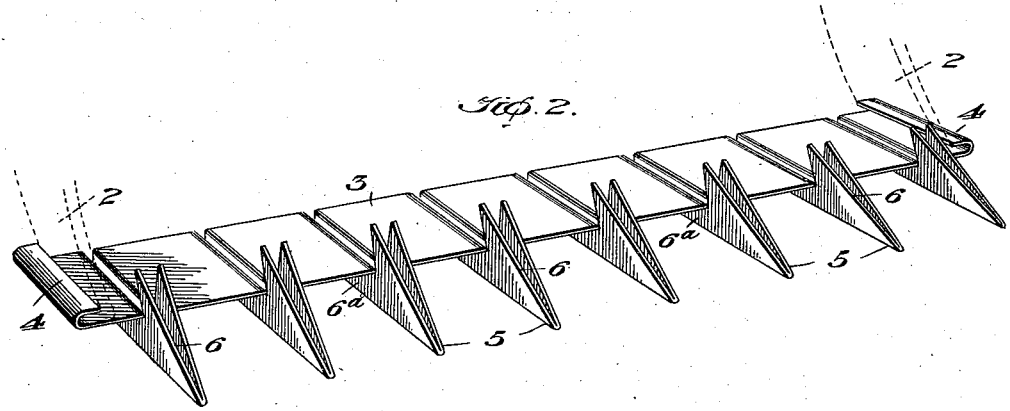
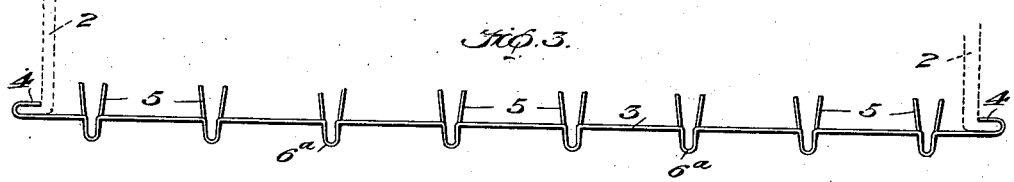
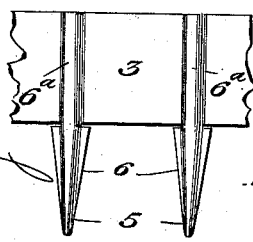

UNITED STATES PATENT OFFICE.

MYLES REGAN, OF PASADENA, CALIFORNIA.

LAWN-MOWER ATTACHMENT.

1,010,318.  Specification of Letters Patent.  Patented Nov. 28, 1911.

Application filed October 24, 1910. Serial No. 588,813.

*To all whom it may concern:*

Be it known that I, MYLES REGAN, a citizen of the United States, residing at Pasadena, in the county of Los Angeles and State of California, have invented certain new and useful Improvements in Lawn-Mower Attachments, of which the following is a specification.

This invention relates to lawn mower attachments.

The present invention relates to those lawn mower attachments whose purpose is to elevate to a more or less standing position fallen grass, running vines, tangled growths, etc., which, ordinarily, escape being severed and it has for its object the provision of an attachment of that character which will be light, strong, durable, inexpensive of manufacture and adapted to travel close to the surface of the ground and so constructed as to insure close cuttings of all grass and other growths.

In carrying out the invention, as will more fully appear hereinafter, the attachment is formed from a single stamping piece or strip of sheet metal of sufficient rigidity to insure its proper operation when in use which is crimped or corrugated at intervals to provide ribs or runners and double fingers whose upper edges are inclined to insure the proper elevation of the grass and other growths; suitable means are provided for the attachment of the device to brackets on the lawn mower.

In the accompanying drawing: Figure 1, is a view showing the attachment applied to a lawn mower; Fig. 2, a detail perspective of the attachment; Fig. 3, a rear elevation thereof; and Fig. 4, a detail bottom view showing the rib formation.

The lawn mower to which the device is attached is shown in outline at 1 in Fig. 1, suitable brackets 2 thereon serving for the attachment of the present invention.

The invention, which is in the form of a comb or finger bar, is made from a single strip 3 of metal of sufficient thickness to afford the requisite strength. Preferably, a steel stamping will be used, the ends of which have lips or flanges 4 to engage the brackets 2.

The stamping as it originally appears is flat and provided with triangular projections located at intervals, which, when the device is in its finished form, as shown, become the double fingers 5 having an inclined upper edge 6 which facilitates the lifting of the grass and other growth into upright position.

The same crimping or forming operation that provides the fingers 5, forms ribs $6^a$, suitably spaced, on the bottom of the strip 3, said ribs serving as runners adapted to travel on the ground and constituting continuations of the lower edges of the fingers as will more fully appear in Figs. 3 and 4.

As the lawn mower travels along, the ribs $6^a$ run on the ground and any fallen grass, running plant, weeds, etc., encountered are pried into upright position by the fingers, ready for severance by the rotary mower knives. The corrugations or ribs $6^a$, continued as the fingers 5, give relatively great strength to the device which it would not otherwise possess.

Having thus described my invention what I claim as new and desire to secure by Letters Patent, is:

An attachment for lawn mowers consisting of a strip of metal bent at intervals to form ribs and fingers, the said ribs and fingers being integral and forming continuations one of the other, the ribs extending beneath the body of the strip and the fingers projecting forwardly therefrom and having their upper edges inclined upwardly and rearwardly, the upper ends of the fingers being located above the plane of the body of the strip and means for attaching the strip to the mower.

In testimony whereof I affix my signature in presence of two witnesses.

MYLES REGAN.

Witnesses:
 MARY GRAVES,
 C. T. JAMES.

Copies of this patent may be obtained for five cents each, by addressing the "Commissioner of Patents, Washington, D. C."